United States Patent
Fernandez Galmes et al.

(10) Patent No.: US 10,736,071 B2
(45) Date of Patent: Aug. 4, 2020

(54) METHOD, AND DEVICES, FOR UPDATING A LOCATION OF A USER EQUIPMENT, UE, WHEN SAID UE MOVES FROM A FIRST TYPE OF TELECOMMUNICATION NETWORK TO A SECOND TYPE OF TELECOMMUNICATION NETWORK

(71) Applicant: Telefonaktiebolaget LM Ericsson (publ), Stockholm (SE)

(72) Inventors: Juan Manuel Fernandez Galmes, Getafe (ES); Maria Cruz Bartolomé Rodrigo, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/317,613

(22) PCT Filed: Nov. 5, 2018

(86) PCT No.: PCT/EP2018/080171
§ 371 (c)(1),
(2) Date: Jan. 14, 2019

(87) PCT Pub. No.: WO2020/025152
PCT Pub. Date: Feb. 6, 2020

(65) Prior Publication Data
US 2020/0084743 A1    Mar. 12, 2020

(30) Foreign Application Priority Data
Jul. 31, 2018    (EP) ..................................... 18382578

(51) Int. Cl.
*H04W 4/00*    (2018.01)
*H04W 60/04*    (2009.01)
(Continued)

(52) U.S. Cl.
CPC ........... *H04W 60/04* (2013.01); *H04W 4/029* (2018.02); *H04W 8/18* (2013.01); *H04W 60/005* (2013.01); *H04W 64/003* (2013.01); *H04W 12/06* (2013.01)

(58) Field of Classification Search
CPC ..... H04W 60/04; H04W 64/003; H04W 8/18; H04W 4/029; H04W 60/005; H04W 12/06
(Continued)

(56) References Cited

U.S. PATENT DOCUMENTS

2019/0373441 A1* 12/2019 Ryu ..................... H04W 68/005
2020/0015294 A1*  1/2020 Xin ........................ H04W 36/08

FOREIGN PATENT DOCUMENTS

WO    2018132468 A1    7/2018

OTHER PUBLICATIONS

"23:501: Clarifications on 5GC-EPC Interworking Aspects Related to UDM/HSS", SA WG2 Meeting #S2-122BIS; S2-175446; Sophia Antipolis, France, Aug. 21-25, 2017, pp. 1-7.
(Continued)

*Primary Examiner* — Amancio Gonzalez
(74) *Attorney, Agent, or Firm* — Murphy, Bilak & Homiller, PLLC

(57) ABSTRACT

A method for updating a location of a User Equipment, UE, when said UE moves from a first type of telecommunication network to a second type of telecommunication network, wherein said method comprises the steps of:
  receiving, by a user subscription node comprised by said second type of telecommunication network, an indication that said UE has requested registration to said second type of telecommunication network;
  determining, by said user subscription node comprised by said second type of telecommunication network, that said UE is registered in said first type of telecommunication network;
(Continued)

transmitting, by said user subscription node comprised by said second type of telecommunication network, a location removal message to a user subscription node comprised by said first type of telecommunication network for removing location information relating to said UE.

17 Claims, 4 Drawing Sheets

(51) Int. Cl.

| | | |
|---|---|---|
| *H04W 4/029* | (2018.01) | |
| *H04W 8/18* | (2009.01) | |
| *H04W 60/00* | (2009.01) | |
| *H04W 64/00* | (2009.01) | |
| *H04W 12/06* | (2009.01) | |

(58) Field of Classification Search
USPC .................................................... 455/435.1
See application file for complete search history.

(56) References Cited

OTHER PUBLICATIONS

"3GPP TR 23.732 V.0.2.0", 3rd Generation Partnership Project; Technical Specification Group Services and System Aspects; Study on User data interworking, Coexistence and Migration (Release 16), Aug. 2018, pp. 1-18.

"3GPP TR 23.732 V0.3.0", 3rd Generation Partnership Project; Technical Specification Group Services and System Aspects; Study on User data interworking, Coexistence and Migration (Release 16), Oct. 2018, pp. 1-50.

"Discussion on Distributed HSS Solution", 3GPP TSG SA WG2 Meeting #71; TD S2-091404 (was S2-091209); Budapest, Hungary, Feb. 16-20, 2009, pp. 1-4.

"EPS to 5GS Mobility", 3GPP TSG-SA2 Meeting #127bis; S2-184929; Newport Beach, US, May 28, 2018-Jun. 1, 2018, pp. 1-8.

"Multiple PDU Session per DNN for Case Without N26", 3GPP TSG-SA WG2 Meeting #127bis; S2-185111; Newport Beach, USA, May 28-Jun. 1, 2018, pp. 1-15.

"Update of Solution 1", SA WG2 Meeting #129; S2-1811502 (revision of S2-1811002); Dongguan, China, Oct. 15-19, 2018, pp. 1-11.

3GPP, "3rd Generation Partnership Project; Technical Specification Group Services and System Aspects; Procedures or the 5G System; Stage 2 (Release 15)", 3GPP TS 23.502 V15.2.0, Jun. 2018, 1-308.

3GPP, "3rd Generation Partnership Project; Technical Specification Group Services and System Aspects; Study on User Data Interworking, Coexistence and Migration (Release 16)", 3GPP TR 23.732 V0.0.0, Jul. 2018, 1-7.

3GPP, "3rd Generation Partnership Project; Technical Specification Group Services and System Aspects; System Architecture for the 5G System; Stage 2 (Release 15)", 3GPP TS 23.501 V15.2.0, Jun. 2018, 1-217.

* cited by examiner

METHOD, AND DEVICES, FOR UPDATING A LOCATION OF A USER EQUIPMENT, UE, WHEN SAID UE MOVES FROM A FIRST TYPE OF TELECOMMUNICATION NETWORK TO A SECOND TYPE OF TELECOMMUNICATION NETWORK

The present disclosure generally relates to the field of telecommunication and, more specifically, to situations in which a UE, registered in a first type of telecommunication network, initiates a request to attach to a second type of telecommunication network.

BACKGROUND

3GPP SA2 has defined an architecture for the fifth Generation System, 5GS, and Evolved Packet System, EPS, interworking based on a number of combined functions. For migration purposes, a Home Subscriber Server+Unified Data Management, HSS+UDM, combination is introduced, and defined as one of the combination functions specified to support interworking between Evolved Packet Core, EPC, and 5GC networks.

If a particular User Equipment, UE, moves from 5G to EPS, then it sends an initial attach/TAU Request to the Mobility Management Entity, MME, that requests the UE context from the Access and Mobility Management function, AMF, where the UE was/is camping. Such a request may involve the N26 interface between the AMF and the MME. After the authentication process, the MME needs to update the location of the UE in the HSS, as is traditionally done in EPC.

After that, the HSS+UDM combination needs to execute UDM business logic and needs to de-register the former AMF. It informs the AMF that it has been de-registered, and the AMF then unsubscribes from subscription data modification changes.

The present disclosure is also directed to the inverse scenario, in which a particular UE was registered in EPC and moves to 5GC. Then, the UE first sends a registration request to the AMF. After the authentication procedure, the new AMF has to be registered to the HSS+UDM combination using the UDM business logic, and services. It will fetch the corresponding subscription data and subscribes to be notified when the subscription data is modified.

Then, the HSS business logic needs to send a Cancel Location messages to the former MME, since the UE is kept registered in one serving node only.

One of the drawbacks of the above described situations, is that there is only limited flexibility in design choices for the HSS and the UDM.

SUMMARY

It would be advantageous to achieve a method for updating a location of a User Equipment, UE, when said UE moves from a first type of telecommunication network to a second type of telecommunication network, which method provides for more flexibility in design, implementation, and deployment choices for the Home Subscriber Server, HSS, and the Unified Data Management, UDM.

It would further be advantageous to achieve a user subscription node, like the HSS and the UDM, which provide for more flexibility in design, implementation, and deployment choices.

In a first aspect of the present disclosure, there is provided a method for updating a location of a User Equipment, UE, when said UE moves from a first type of telecommunication network to a second type of telecommunication network.

The method comprises the steps of:
receiving, by a user subscription node comprised by said second type of telecommunication network, an indication that said UE has requested registration to said second type of telecommunication network;
determining, by said user subscription node comprised by said second type of telecommunication network, that said UE is registered in said first type of telecommunication network;
transmitting, by said user subscription node comprised by said second type of telecommunication network, a location removal message to a user subscription node comprised by said first type of telecommunication network for removing location information relating to said UE.

It was one of the insights that issues may arise in the known prior art when the HSS and the UDM are not from the same vendor. The current described architecture does not allow for a multi-vendor based approach for the UDM and the HSS.

The present disclosure is directed to the concept in which the HSS and the UDM are split and are, for example, provided by different vendors. It is noted that, in accordance with the present disclosure, a user subscription node may be implemented as an HSS or an UDM.

More specifically, the present disclosure discloses a communication principle between two user subscription nodes residing in different types of telecommunication networks, for providing more flexibility in design choices for each of the user subscription nodes.

One of the aspects of the present disclosure is that the user subscription node comprised by said second type of telecommunication network transmits a location removal message to a user subscription node comprised by said first type of telecommunication network for removing location information relating to said UE. Such a message enables the user subscription node comprised by the first type of telecommunication network to remove the location information relating to the UE.

The location removal message is thus sent, over the telecommunication networks.

It is noted that the above described method is applicable when a User Equipment, UE, moves from the 5G network to the 4G network, but is also applicable when a UE moves from the 4G network to the 5G network.

In an example, the step of determining comprises any of:
determining that said UE is registered in said first type of telecommunication network by retrieving, by said user subscription node comprised by said second type of telecommunication network, a subscription profile of said UE in a subscriber database comprised by said second type of telecommunication network, wherein said subscription profile comprises an indication that said UE is registered in said first type of telecommunication communication network;
determining that said UE is registered in said first type of telecommunication network by retrieving, by said user subscription node comprised by said second type of telecommunication network, an indication that said UE is registered in said first type of telecommunication communication network, from a subscriber database comprised by said first type of telecommunication network.

It is noted that the user subscription node comprised by the second type of telecommunication network may first determine whether it is required to transmit a location removal message to the user subscription node comprised by the first type of telecommunication network.

This will be explained with respect to a UE moving from a 4G network to a 5G network but may also be applicable in vice versa scenario's, wherein a UE moves from a 5G network to a 4G network.

The subscription profile of the UE may be contained in the subscriber database, for example the Unified Data Repository, UDR. The subscription provide may include the information of whether this particular UE is also a 4G user. This may be known by the operator of the network, and could be requested at provisioning.

It is noted that 3GPP states that 4G user data is stored in HSS and 5G user data is stored in UDM. Optionally it is possible to decouple UDM+5G UDR and HSS+4G UDR, but this is a deployment option where data is separated from business logic.

Another option is that the UDM directly tries to read this information from the subscriber information in the EPC UDR. This may require that the UDM implements the Ud/LDAP interface for accessing the UDR.

In another example, the user subscription node comprised by said second type of telecommunication network and said user subscription node comprised by said first type of telecommunication network both have access to a converged database, wherein said converged database comprises consolidated subscription profiles for UE's, wherein said step of determining comprises:
retrieving, by said user subscription node comprised by said second type of telecommunication network, an indication that said UE is registered in said first type of telecommunication communication network, from said converged database.

The converged database is, for example a converged subscription data repository.

The above example is directed to the concept that the converged database comprises subscription profiles for the UE's. Each UE has a single subscription profile stored in the converged database. A single subscription profile is valid for a 5G subscription but also for a 4G subscription. The UE thus no longer has a 4G subscription profile as well as a 5G subscription profile. These are combined into a single subscription profile. The converged database is accessible to both the 4G network, i.e. the HSS, and the 5G network, i.e. the UDM.

In a further example, the method further comprises the step of:
receiving, by said user subscription node comprised by said second type of telecommunication network, an acknowledgement message, from said user subscription node comprised by said first type of telecommunication, which acknowledgement message acknowledges removal of location information relating to said UE.

The advantage of the above is that the initial user subscription node is made aware of the fact that the location information has actually been removed.

In another example, the step of determining further comprises:
determining that there is a need for removing location information relating to said UE from said user subscription node comprised by said first type of telecommunication network by determining that said need is preconfigured in said user subscription node comprised by said second type of telecommunication network.

It may be beneficial that the user subscription node first determines whether there is a need for removing location information relating to the UE. That is, the removal of the location information may be of interest when there is a need for, for example, 4G/5G interworking. The different telecommunication network may, thus, work together.

In yet another example, the user subscription node comprised by said first type of telecommunication network provides for an network-to-network interworking service, wherein said step of determining further comprises:
discovering, by said user subscription node comprised by said second type of telecommunication network, said provided network-to-network interworking service;
using, by said user subscription node comprised by said second type of telecommunication network, said network-to-network interworking service for determining that there is a need for removing location information relating to said UE from said user subscription node comprised by said first type of telecommunication network.

In a further example, any of:
said first type of telecommunication network is a 5G telecommunication network, said second type of telecommunication network is a 4G telecommunication network, said user subscription node comprised by said first type of telecommunication network is a User Data Management node, and said user subscription node comprised by said second type of telecommunication network is a Home Subscriber Server node;
said first type of telecommunication network is a 4G telecommunication network, said second type of telecommunication network is a 5G telecommunication network, said user subscription node comprised by said first type of telecommunication network is a Home Subscriber Server node, and said user subscription node comprised by said second type of telecommunication network is a User Data Management node.

In yet another example, the step of transmitting comprises:
transmitting, by said user subscription node comprised by said second type of telecommunication network, said location removal message over a corenetwork-to-corenetwork interface.

In a second aspect of the present disclosure there is provided a user subscription node arranged to be operative in a second type of telecommunication network, and arranged for updating a location of a User Equipment, UE, when said UE moves from a first type of telecommunication network to a second type of telecommunication network, wherein said user subscription node comprises:
receive equipment arranged for receiving an indication that said UE has requested registration to said second type of telecommunication network;
process equipment arranged for determining that said UE is registered in said first type of telecommunication network;
transmit equipment arranged for transmitting a location removal message to a user subscription node comprised by said first type of telecommunication network for removing location information relating to said UE.

It is noted that the advantages as mentioned with respect to the first aspect of the present disclosure, being the method, are also valid with respect to the second aspect of the present disclosure, being the user subscription node.

It is further noted that the subscription node, in accordance with the present disclosure, may be any of an HSS and a UDM.

It is further appreciated that the equipment as disclosed with respect to the second aspect of the present disclosure, may be considered as a module, unit, device, or anything alike.

In an example, the process equipment is further arranged for any of:

determining that said UE is registered in said first type of telecommunication network by retrieving, by said user subscription node comprised by said second type of telecommunication network, a subscription profile of said UE in a subscriber database comprised by said second type of telecommunication network, wherein said subscription profile comprises an indication that said UE is registered in said first type of telecommunication communication network;

determining that said UE is registered in said first type of telecommunication network by retrieving, by said user subscription node comprised by said second type of telecommunication network, an indication that said UE is registered in said first type of telecommunication communication network, from a subscriber database comprised by said first type of telecommunication network.

In a further example, said user subscription node comprised by said second type of telecommunication network and said user subscription node comprised by said first type of telecommunication network both are arranged to access a converged database, wherein said converged database comprises consolidated subscription profiles for UE's, wherein said process equipment further comprises:

retrieving an indication that said UE is registered in said first type of telecommunication communication network, from said converged database.

In another example, said user subscription node further comprises:

receive equipment arranged for receiving an acknowledgement message, from said user subscription node comprised by said first type of telecommunication, which acknowledgement message acknowledges removal of location information relating to said UE.

In an example, the user subscription node further comprises:

determining that there is a need for removing location information relating to said UE from said user subscription node comprised by said first type of telecommunication network by determining that said need is preconfigured in said user subscription node comprised by said second type of telecommunication network.

In a further example, the user subscription node comprised by said first type of telecommunication network is arranged for providing for an network-to-network interworking service, wherein said process equipment is further arranged for:

discovering said provided network-to-network interworking service;

using said network-to-network interworking service for determining that there is a need for removing location information relating to said UE from said user subscription node comprised by said first type of telecommunication network.

In an example, any of:

said first type of telecommunication network is a 5G telecommunication network, said second type of telecommunication network is a 4G telecommunication network, said user subscription node comprised by said first type of telecommunication network is a User Data Management node, and said user subscription node comprised by said second type of telecommunication network is a Home Subscriber Server node;

said first type of telecommunication network is a 4G telecommunication network, said second type of telecommunication network is a 5G telecommunication network, said user subscription node comprised by said first type of telecommunication network is a Home Subscriber Server node, and said user subscription node comprised by said second type of telecommunication network is a User Data Management node.

In yet another example, the transmit equipment is further arranged for transmitting said location removal message over a corenetwork-to-corenetwork interface.

In a third aspect of the present disclosure, there is provided a computer program product comprising a computer readable medium having instructions stored thereon which, when executed by a user subscription node comprises by a second type of telecommunication network, cause said user subscription node to implement a method according to any of the examples as provided above.

The above mentioned and other features and advantages of the disclosure will be best understood from the following description referring to the attached drawings. In the drawings, like reference numerals denote identical parts or parts performing an identical or comparable function or operation.

DETAILED DESCRIPTION

Figure 1:
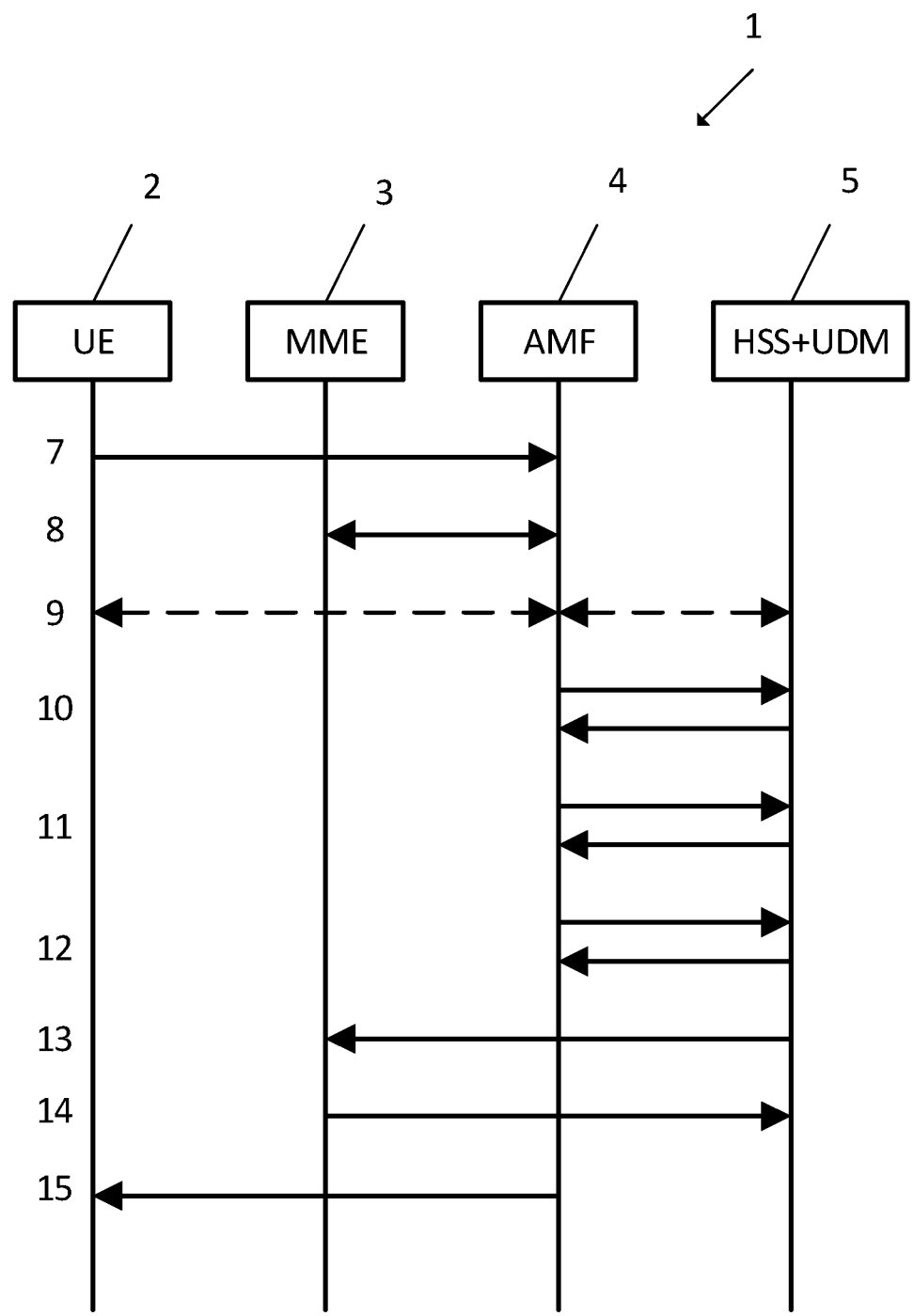
FIG. 1 schematically illustrates a flow chart of an example of updating a location of a User Equipment, UE, when said UE moves from a first type of network to a second type of network in accordance with the prior art.

FIG. 1 schematically illustrates a flow chart 1 of an example of updating a location of a User Equipment, UE, when said UE moves from a first type of network to a second type of network in accordance with the prior art.

Here, the flow chart 1 indicates an example in which a particular UE 2 moves from the 4G network to the 5G network. The UE 2 is thus, currently, actively residing in the 4G network but decides to move to the 5G network instead.

In a first step 7, the UE 2 sends an initial registration request to the Access and Mobility Function, AMF, 4 for requesting registration of the UE 2 in the 5G network. Such a registration request may be considered a mobility registration update for updating the registration of the UE 2 from a 4G type to a 5G type.

The AMF 4 may, subsequently, request the context 8 from the MME 3 at which the UE 2 was previously camping in the 4G network. Such a request may, for example, be sent over the N26 interface that has already been specified in the 5G standard.

In a subsequent step 9, the authorization request between the UE 2 and the AMF 4, as well as the authentication information between the AMF 4 and the HSS+UDM 5 are performed. Here, the Home Subscriber Server, i.e. the user subscription node in 4G, as well as the Unified Data Management, UDM, i.e. the user subscription node in 5G, are comprised by a single entity.

The steps as indicated with reference numeral 10, 11 and 12 are performed for assuring that the UE 2 is able to register in the 5G network.

Once the above steps have been completed, a cancel location message is sent 13 from the HSS+UDM 5 to the MME 3, for indicating the location change of the UE 2 to the MME 3. That particular message may be acknowledged 14 by the MME 3 towards the HSS+UDM 5.

In a final step 15 the AMF 4 may send an registration accept message back to the UE 2 indicating to the UE 2 that the registration has been accepted.

In the above identified case, the UE 2 was registered in the Evolved Packet Core, EPC, and moves to 5GC. Then the UE 2 registers in the AMF 4. After the authentication procedure, the new AMF 4 has to be registered to the combo HSS+UDM 5 using the UDM business logic, and services, it gets corresponding subscription data and subscribes to be notified when the subscription data is modified. Then, the HSS business logic needs to send 13 a Cancel Location to the former MME 3, since the UE is kept registered in one serving node only.

Figure 2:
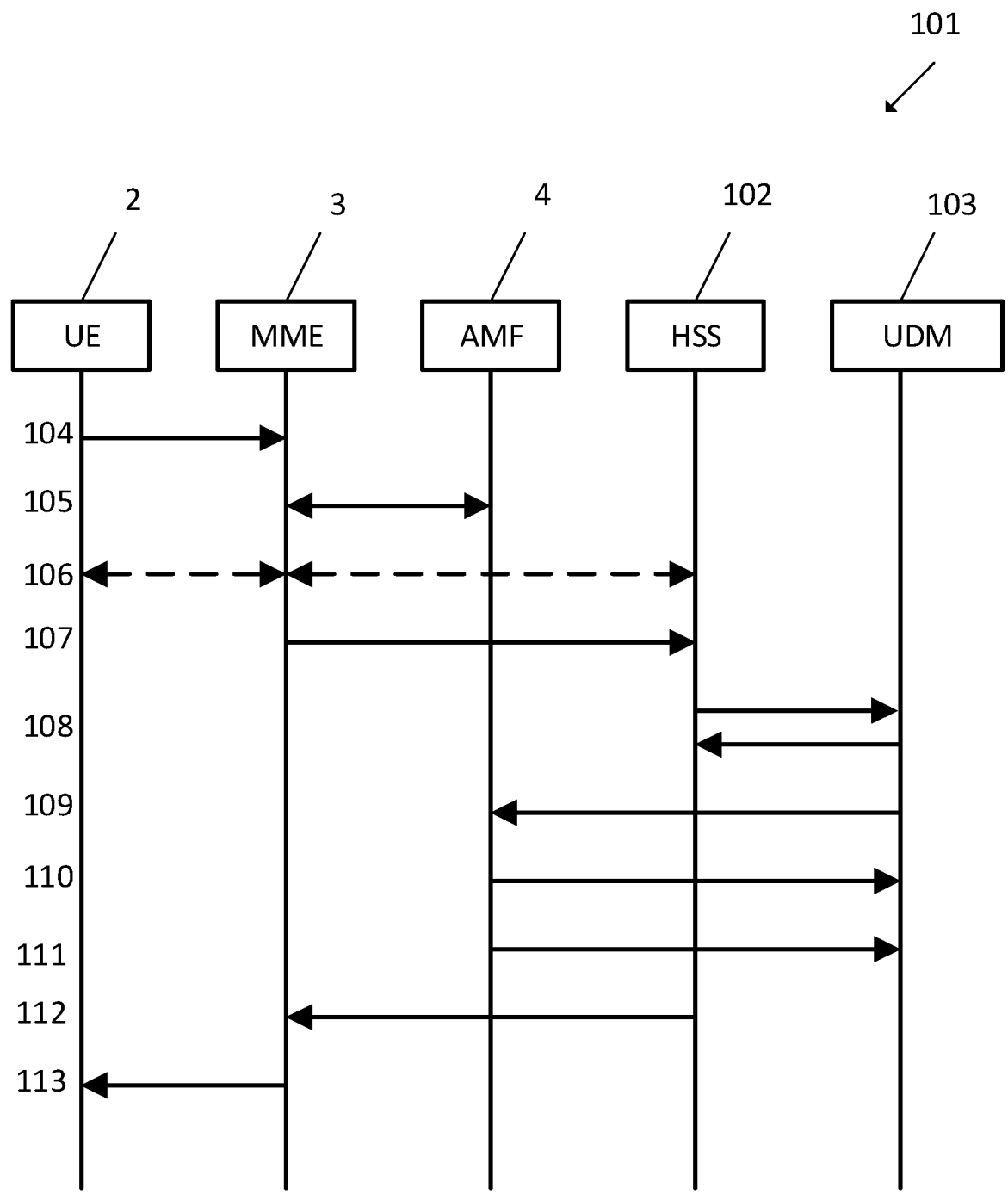
FIG. 2 schematically illustrates a flow chart of an example of updating a location of a User Equipment, UE, when said UE moves from a first type of network to a second type of network in accordance with the present disclosure.

FIG. 2 schematically illustrates a flow chart 101 of an example of updating a location of a User Equipment, UE, when said UE moves from a first type of network to a second type of network in accordance with the present disclosure.

In the figures, the same reference numerals are used for the same, or similar, function or operation.

FIG. 2 discloses a situation in which the UE 2 moves from the 5G network to the 4G network.

In a first step 104, the UE 2 sends an initial Attach/TAU request to the MME for requesting to be attached, i.e. connected, to the 4G network. The context request is then exchanged 105 between the MME 3 and the AMF 4.

In a subsequent step 107, the MME 3 sends a update location message to the user subscription node comprised by a second type of telecommunication network, i.e. the HSS 102 comprised by the 4G telecommunication network.

The HSS 102 may then determine that the UE 2 is currently registered in the 5G network. Such information may, for example, be comprised in the update location message.

Then, a location removal message is transmitted, and confirmed, as indicated with reference numeral 108. This indicates to a user subscription node comprised by the first type of telecommunication network, i.e. the UDM 103 comprised by the 5G network, that the location information relating to the UE 2 is to be removed.

In a subsequent step 109, a deregistration notification is sent from the UDM 103 to the AMF 4 with a reason that the UE 2 has decided to register to the 4G network. This message may be acknowledged as indicated with reference numeral 110.

In the following step 111, a SDM unsubscribe message is sent from the AMF 4 to the UDM 103.

Even further an update location acknowledgement is sent 112 from the HSS 102 to the MME 3, and, finally, an accept message 113 is then sent back to the UE 2.

Figure 3:
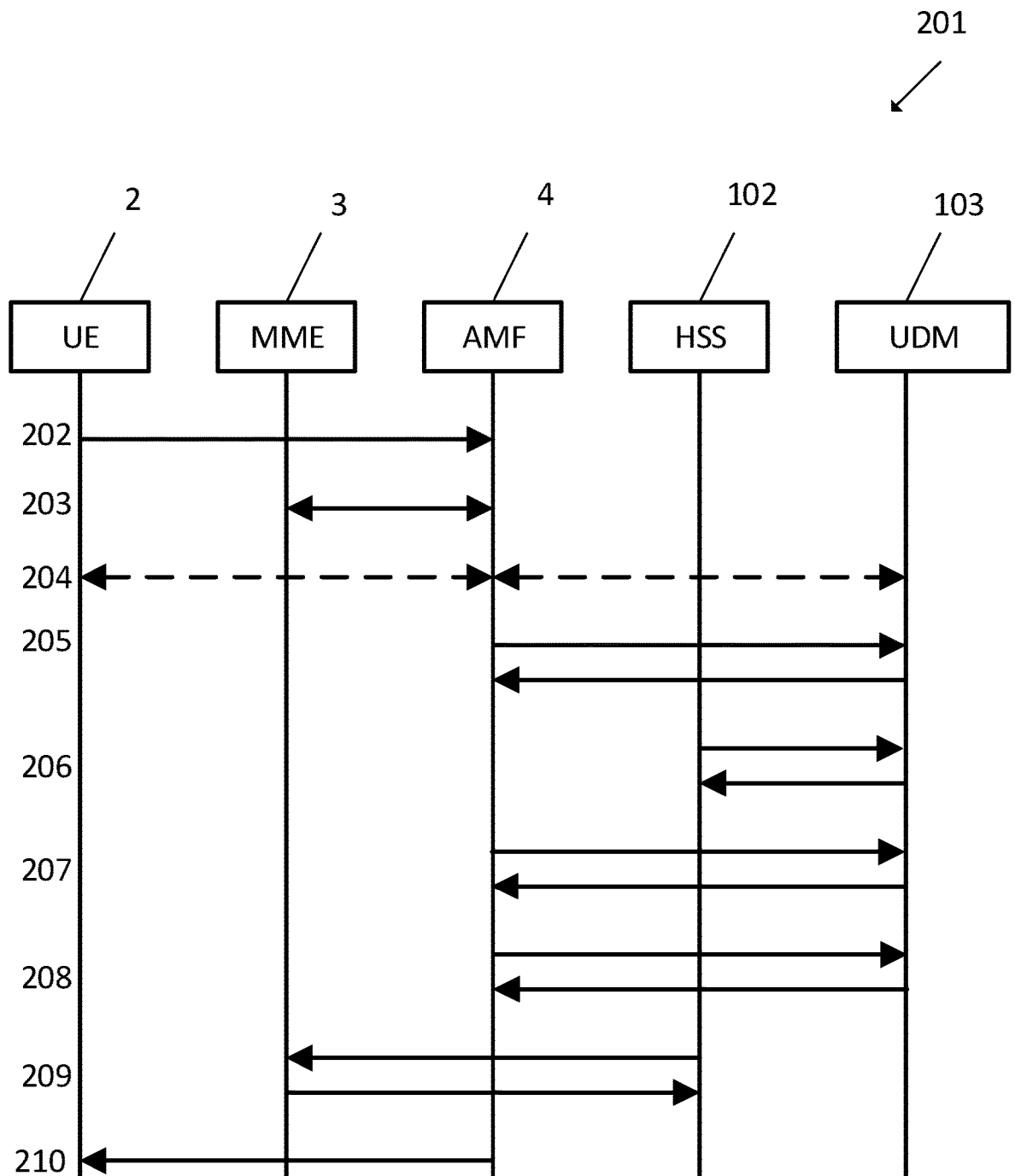
FIG. 3 schematically illustrates a flow chart of another example of updating a location of a User Equipment, UE, when said UE moves from a first type of network to a second type of network in accordance with the present disclosure.

FIG. 3 schematically illustrates a flow chart 201 of another example of updating a location of a User Equipment, UE, when said UE moves from a first type of network to a second type of network in accordance with the present disclosure. Here, the flow chart 201 illustrated an example in which a UE 2 decides to move from the 4G network to the 5G network. The steps as shown in FIG. 3 are similar to the steps as shown in FIG. 2, and are summarized, briefly, here below.

In a first step 202, a registration request is sent from the UE 2 to the AMF 4. The context request 203 is exchanged between the AMF 4 and the MME 3. Then, the authorization request is tackled between the AMF 4 and the UE 2 and the authentication information is exchanged between the AMF 4 and the UDM 103. Next, the UECM registration is exchanged between the AMD 4 and the UDM 103. Then, the location removal message is exchanged between the HSS 102 and the UDM 103 as indicated with reference numeral 206. Even further, a Get function 207 as well as a subscription function 208, are exchanged between the AMF 4 and the UDM 103.

The cancel location message is then sent 209 from the HSS 102 to the MME 3, and is, subsequently, acknowledged. Finally, a registration accept message 210 is sent from the AMF 4 to the UE 2.

Figure 4:
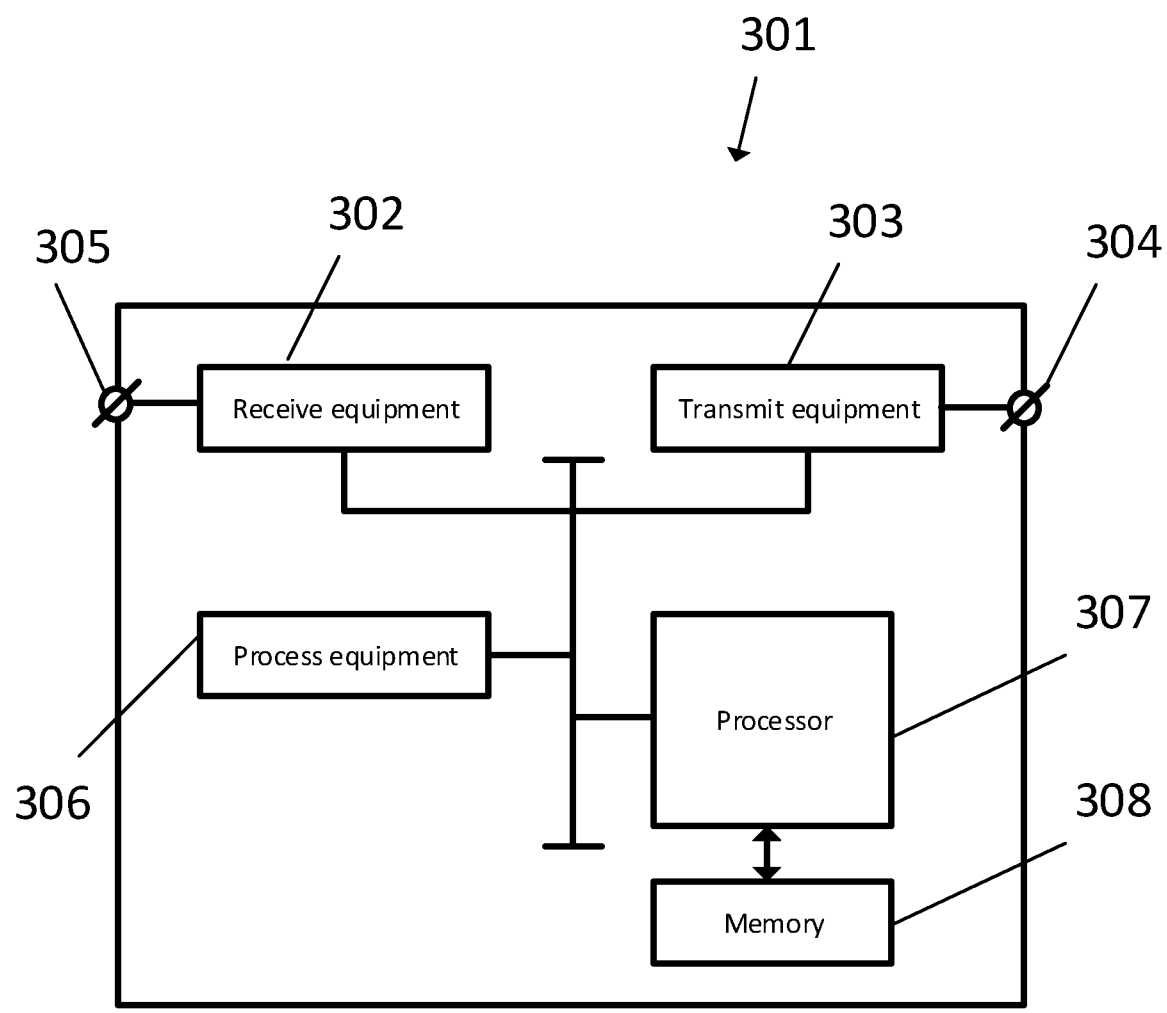
FIG. 4 schematically illustrates a schematic diagram of a user subscription node in accordance with the present disclosure.

FIG. 4 schematically illustrates a schematic diagram of a user subscription node in accordance with the present disclosure.

The user subscription node 301 is arranged to be operative in a second type of telecommunication network, and arranged for updating a location of a User Equipment, UE, when said UE moves from a first type of telecommunication network to a second type of telecommunication network.

The user subscription node 301 comprises:
receive equipment 302 arranged for receiving, via a receiving terminal 305, an indication that said UE has requested registration to said second type of telecommunication network;
process equipment 306 arranged for determining that said UE is registered in said first type of telecommunication network;
transmit equipment 303 arranged for transmitting, via a transmitting terminal 304, a location removal message to a user subscription node comprised by said first type of telecommunication network for removing location information relating to said UE.

The user subscription node 301 further comprises a processor 307 in communication with a memory 308, wherein said processor is connected to said receive equipment 302, said process equipment 306 and said transmit equipment 303 via a bus.

This disclosure proposes a solution that allows coexistence of HSS and UDM from different vendors in the network and still be able to support mobility of a UE from 5GC to/from EPS (IRAT between 4G and 5G).

This disclosure proposes to send a location removal as a new interaction from HSS to UDM when there is mobility from 5GC to EPC, and from UDM to HSS when there is mobility from EPC to 5GC.

The disclosure proposes additionally to determine when this location removal is required, before sending it, in order to optimize signalling.

This disclosure discloses the communication between HSS and UDM to be able to deploy both 5GC UDM and EPC HSS in the same network from different vendors, for the 4G/5G IRAT mobility use cases, specifically for the case when the N26 interface exists between AMF and MME.

The mobility from 5GC to EPC is described in following
The call flow is similar to prior art use case, but when the HSS receives the Update Location from the MME, then it may remove Location information in the UDM. The opposite mobility, EPC to 5GC, is described more in detail in the following. This is merely an example of how the present disclosure could be implemented in a telecommunication network.

1. UDM receives Nudm_UECM_Registration request from AMF including SUPI and 3GPP registration AMF information. The message is understood and passed to the AMF registration logic to be processed. Check message is complete and well-formed. Retrieve subscription data from the UDR.

As an optimization the UDM can get from UDR the information about whether this user is also a 4G user. This information may be provided by different means:

The Subscription profile in 5GC UDR is defined to include the information of whether this user is as well 4G user. This is known by the operator and could be requested at provisioning.

The UDM tries to read from EPC UDR this subscriber information. This would require the UDM to implement Ud/LDAP interface which is very inconvenient.

In case of 5GC UDR and EPC UDR single vendor, then this "converged DB" can include a consolidated subscription profile (i.e. only one subscription profile exists per user, not one per 5GC and other per EPC), that could include easily this information. For an existing 4G user the profile is updated to 5GC including new data, then when 5GC data is read, it could be added the information about whether this subscription is 4G enabled.

Based on SUPI subscription and input information received performs the corresponding authorization checks.

Received AMF registration information is stored in UDR replacing previous information if any and Registration is accepted If there was AMF Registration info stored, Nudm_UECM_Deregistration_Notification is sent to old AMF 2. If there is a need for 4G/5G IWK and the user is not AMF Registered (retrieved from UDR), the new Location Removal operation may be sent to HSS.

The need for 4G/5G InterWorking could be known by the UDM by different means:

It could be configured

The interaction between HSS and UDM could be provided by new SBA services.

HSS produces Nhss_EpcInterworking SBA service, that is registered in the NRF, and then discovered/selected by UDM. If the service exists (i.e. is registered), then IWK shall be executed.

UDM produces Nudm_5gInterworking SBA service, that is registered in the NRF, and then discovered/selected by HSS. If the service exists (i.e. is registered), then IWK shall be executed.

Note in this step the Location removal message/indication sent from UDM to HSS is only required if there is a need for IWK, or if the user is as well defined as a 4G user. Take into account a user could be defined as only 5G user. Then, as a signaling optimization, the UDM could check the user profile to identify whether the user is 4G enabled.

3. The rest of the Registration use case is executed (Nudm Get and Nudm Subscription) as prior art.

This present disclosure provides for the following advantages:

It defines a solution that allows coexistence of HSS and UDM from different vendors in the network and still be able to support mobility of a UE from 5GC to/from EPS.

It includes a signalling optimization to interact only with HSS when the user does have a 4G subscription.

In a first embodiment the system comprises a first 5G core network with a first subscriber node and second 4G EPC network comprising a second subscriber node, and a UE connected to the second network. The first subscriber node performing the following steps in case of an IRAT hand over of the UE from 4G to 5G;

The First subscriber node receives a registration message of the UE for registration in the 5G core network, The first subscriber nodes checks if the subscriber has a 4G EPC network subscription or that 4G/5G IWK is required, If confirmative the first subscriber node sends a location removal message to the second subscriber node.

In a second embodiment the system comprises a first 5G core network with a first subscriber node and second 4G EPC network comprising a second subscriber node, and a UE connected to the first network. The second subscriber node performing the following steps in case of an IRAT hand over of the UE from 5G to 4G;

The second subscriber node receives an update location message for the UE,

The second subscriber node sends a location removal message to the first subscriber node.

Embodiments contemplated by the present disclosure will now be described more in detail with reference to the accompanying drawings. Other embodiments, however, are contained within the scope of the subject matter disclosed herein. The disclosed subject matter should not be construed as limited to only the embodiments set forth herein. Rather, the illustrated embodiments are provided by way of example to convey the scope of the subject matter to those skilled in the art.

The invention claimed is:

1. A method, by a user subscription node of a second type of telecommunication network, for updating a location of a User Equipment (UE) when said UE moves from a first type of telecommunication network to the second type of telecommunication network, wherein said method comprises the steps of:

receiving, from a registration node of the first type of telecommunication network, an indication that said UE has requested registration to said second type of telecommunication network;

determining that said UE is currently registered in said first type of telecommunication network; and transmitting, to a user subscription node of the first type of telecommunication network, a location removal message for removing location information relating to said UE from the user subscription node of the first type of telecommunication network.

2. A method in accordance with claim 1, wherein said step of determining comprises any of the following operations:

determining that said UE is registered in said first type of telecommunication network by retrieving, by said user subscription node of the second type of telecommunication network, a subscription profile of said UE in a subscriber database of the second type of telecommunication network, wherein said subscription profile comprises an indication that said UE is registered in said first type of telecommunication communication network; and determining that said UE is registered in said first type of telecommunication network by retrieving, by said user subscription node of the second type of telecommunication network, an indication that said UE is registered in said first type of telecommunication communication network, from a subscriber database of the first type of telecommunication network.

3. A method in accordance with claim 1, wherein the determining operation comprises:
retrieving, by said user subscription node of the second type of telecommunication network, an indication that said UE is registered in said first type of telecommunication communication network from a converged database comprising a consolidated subscription profile for the UE, wherein the converged database is also accessible by said user subscription node of the first type of telecommunication network.

4. A method in accordance with claim 1, wherein said method further comprises the step of:
receiving, by said user subscription node of the second type of telecommunication network from said user subscription node of the first type of telecommunication, an acknowledgement message that acknowledges removal of location information relating to said UE.

5. A method in accordance with claim 1, wherein the determining operation further comprises:
determining a need for removing location information relating to said UE from said user subscription node of the first type of telecommunication network by determining that said need is preconfigured in said user subscription node of the second type of telecommunication network.

6. A method in accordance with claim 1, wherein said user subscription node of the first type of telecommunication network provides a network-to-network interworking service, wherein the determining operation further comprises:
discovering, by said user subscription node of the second type of telecommunication network, said provided network-to-network interworking service; and
using, by said user subscription node of the second type of telecommunication network, said network-to-network interworking service for determining that there is a need for removing location information relating to said UE from said user subscription node of the first type of telecommunication network.

7. A method in accordance with claim 1, wherein one of the following two sets of conditions applies:
said first type of telecommunication network is a 5G telecommunication network, said second type of telecommunication network is a 4G telecommunication network, said user subscription node of the first type of telecommunication network is a User Data Management node, and said user subscription node of the second type of telecommunication network is a Home Subscriber Server node; or
said first type of telecommunication network is a 4G telecommunication network, said second type of telecommunication network is a 5G telecommunication network, said user subscription node of the first type of telecommunication network is a Home Subscriber Server node, and said user subscription node of the second type of telecommunication network is a User Data Management node.

8. A method in accordance with claim 1, wherein said location removal message is transmitted over a core network-to-core network interface.

9. A non-transitory, computer readable medium having computer- executable instructions stored thereon, wherein execution of the instructions by a user subscription node of a second type of telecommunication network configure said user subscription node to perform operations corresponding to the method in accordance with claim 1.

10. A user subscription node arranged to be operative in a second type of telecommunication network, and arranged for updating a location of a User Equipment (UE) when said UE moves from a first type of telecommunication network to the second type of telecommunication network, wherein said user subscription node comprises:
a processor; and
a computer-readable medium having instructions stored thereon, wherein execution of the instructions by the processor configures the user subscription node of the second type of telecommunication network to:
receive, from a registration node of the first type of network, an indication that said UE has requested registration to said second type of telecommunication network;
determine that said UE is currently registered in said first type of telecommunication network; and
transmit, to a user subscription node of the first type of telecommunication network, a location removal message for removing location information relating to said UE from the user subscription node of the first type of telecommunication network.

11. A user subscription node in accordance with claim 10, wherein execution of the instructions further configures the user subscription node to perform any of the following operations:
determine that said UE is registered in said first type of telecommunication network by retrieving a subscription profile of said UE in a subscriber database of the second type of telecommunication network, wherein said subscription profile comprises an indication that said UE is registered in said first type of telecommunication communication network; and
determine that said UE is registered in said first type of telecommunication network by retrieving an indication that said UE is registered in said first type of telecommunication communication network, from a subscriber database of the first type of telecommunication network.

12. A user subscription node in accordance with claim 10, wherein the user subscription node is arranged to access a converged database that is also accessible by said user subscription node of the first type of telecommunication network, wherein said converged database comprises a consolidated subscription profile for the UE, wherein execution of the instructions further configures the user subscription node to:
retrieve an indication that said UE is registered in said first type of telecommunication communication network from said converged database.

13. A user subscription node in accordance with claim 10, wherein execution of the instructions further configures the user subscription node to:
receive an acknowledgement message, from said user subscription node of the first type of telecommunication, that acknowledges removal of location information relating to said UE.

14. A user subscription node in accordance with claim 10, wherein execution of the instructions further configures the user subscription node to:
determine a need for removing location information relating to said UE from said user subscription node of the first type of telecommunication network by determining that said need is preconfigured in said user subscription node of the second type of telecommunication network.

15. A user subscription node in accordance with claim 10, wherein said user subscription node of the first type of telecommunication network is arranged to provide a network-to-network interworking service, wherein execution of the instructions further configures the user subscription node to:
- discover said provided network-to-network interworking service;
- use said network-to-network interworking service for determining that there is a need for removing location information relating to said UE from said user subscription node of the first type of telecommunication network.

16. A user subscription node in accordance with claim 10, wherein one of the following two sets of conditions applies:
- said first type of telecommunication network is a 5G telecommunication network, said second type of telecommunication network is a 4G telecommunication network, said user subscription node of the first type of telecommunication network is a User Data Management node, and said user subscription node of the second type of telecommunication network is a Home Subscriber Server node; or
- said first type of telecommunication network is a 4G telecommunication network, said second type of telecommunication network is a 5G telecommunication network, said user subscription node of the first type of telecommunication network is a Home Subscriber Server node, and said user subscription node of the second type of telecommunication network is a User Data Management node.

17. A user subscription node in accordance with claim 10, wherein execution of the instructions further configures the user subscription node to transmit said location removal message over a core network-to-core network interface.

* * * * *

UNITED STATES PATENT AND TRADEMARK OFFICE
CERTIFICATE OF CORRECTION

PATENT NO. : 10,736,071 B2
APPLICATION NO. : 16/317613
DATED : August 4, 2020
INVENTOR(S) : Fernandez Galmes et al.

Page 1 of 3

It is certified that error appears in the above-identified patent and that said Letters Patent is hereby corrected as shown below:

In the Specification

In Column 1, below Title, at Line 7, insert heading -- DESCRIPTION --.

In Column 1, Line 9, delete "telecommunication and," and insert -- telecommunication network and, --, therefor.

In Column 2, Lines 56-57, delete "telecommunication communication network;" and insert -- telecommunication network; --, therefor.

In Column 2, Lines 62-63, delete "telecommunication communication network," and insert -- telecommunication network, --, therefor.

In Column 3, Line 11, delete "provide" and insert -- provided --, therefor.

In Column 3, Line 34, delete "telecommunication communication network," and insert -- telecommunication network, --, therefor.

In Column 3, Lines 53-54, delete "telecommunication," and insert -- telecommunication network, --, therefor.

In Column 4, Line 9, delete "an network-to-network" and insert -- a network-to-network --, therefor.

In Column 5, Lines 14-15, delete "telecommunication communication network;" and insert -- telecommunication network; --, therefor.

In Column 5, Lines 20-21, delete "telecommunication communication network," and insert -- telecommunication network, --, therefor.

Signed and Sealed this
Fifth Day of January, 2021

Andrei Iancu
*Director of the United States Patent and Trademark Office*

CERTIFICATE OF CORRECTION (continued)
U.S. Pat. No. 10,736,071 B2

In Column 5, Lines 32-33, delete "telecommunication communication network," and insert -- telecommunication network, --, therefor.

In Column 5, Line 38, delete "telecommunication," and insert -- telecommunication network, --, therefor.

In Column 5, Line 51, delete "an network-to-network" and insert -- a network-to-network --, therefor.

In Column 7, Line 14, delete "an registration" and insert -- a registration --, therefor.

In Column 7, Line 39, delete "a update" and insert -- an update --, therefor.

In Column 8, Line 11, delete "AMD 4" and insert -- AMF 4 --, therefor.

In Column 8, Line 63, delete "following" and insert -- following: --, therefor.

In Column 9, Line 33, delete "accepted" and insert -- accepted. --, therefor.

In Column 9, Line 35, delete "AMF" and insert -- AMF. --, therefor.

In Column 9, Line 41, delete "configured" and insert -- configured. --, therefor.

In Column 9, Lines 58-59, delete "(Nudm Get and Nudm Subscription)" and insert -- (Nudm_Get and Nudm_Subscription) --, therefor.

In the Claims

In Column 10, Lines 61-62, in Claim 2, delete "telecommunication communication network;" and insert -- telecommunication network; --, therefor.

In Columns 10 & 11, Lines 67 & 1, in Claim 2, delete "telecommunication communication network," and insert -- telecommunication network, --, therefor.

In Column 11, Lines 7-8, in Claim 3, delete "telecommunication communication network" and insert -- telecommunication network --, therefor.

In Column 11, Lines 17-18, in Claim 4, delete "telecommunication," and insert -- telecommunication network, --, therefor.

In Column 12, Lines 33-34, in Claim 11, delete "telecommunication communication network;" and insert -- telecommunication network; --, therefor.

In Column 12, Lines 37-38, in Claim 11, delete "telecommunication communication network," and insert -- telecommunication network, --, therefor.

CERTIFICATE OF CORRECTION (continued)
U.S. Pat. No. 10,736,071 B2

In Column 12, Line 50, in Claim 12, delete "telecommunication communication network" and insert -- telecommunication network --, therefor.

In Column 12, Line 56-57, in Claim 13, delete "telecommunication," and insert -- telecommunication network, --, therefor.